US011865618B2

(12) United States Patent
Champion et al.

(10) Patent No.: US 11,865,618 B2
(45) Date of Patent: Jan. 9, 2024

(54) TRACER GAS ENDPOINT-MONITORED SINTER SYSTEMS

(71) Applicant: Hewlett-Packard Development Company, L.P., Spring, TX (US)

(72) Inventors: David A. Champion, Corvallis, OR (US); John Gary Liebeskind, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 344 days.

(21) Appl. No.: 17/251,866

(22) PCT Filed: Dec. 26, 2018

(86) PCT No.: PCT/US2018/067535
§ 371 (c)(1),
(2) Date: Dec. 14, 2020

(87) PCT Pub. No.: WO2020/139325
PCT Pub. Date: Jul. 2, 2020

(65) Prior Publication Data
US 2021/0308757 A1 Oct. 7, 2021

(51) Int. Cl.
*B22F 3/10* (2006.01)
*B22F 3/00* (2021.01)
(Continued)

(52) U.S. Cl.
CPC .............. *B22F 3/003* (2013.01); *B22F 3/101* (2013.01); *B22F 3/1007* (2013.01);
(Continued)

(58) Field of Classification Search
CPC .. B22F 3/00; B22F 3/10; B22F 3/1007; B22F 10/85; B22F 10/322; B22F 3/101;
(Continued)

(56) References Cited

U.S. PATENT DOCUMENTS

| 4,719,073 A | 1/1988 | Langan |
| 4,781,358 A | 11/1988 | Langan |

(Continued)

FOREIGN PATENT DOCUMENTS

| CN | 101975514 | 2/2011 |
| CN | 103017530 | 4/2013 |

(Continued)

*Primary Examiner* — Gregory A Wilson
(74) *Attorney, Agent, or Firm* — Shook, Hardy & Bacon L.L.P.

(57) ABSTRACT

An example sinter system includes a sinter gas inlet at a sinter furnace for a sinter gas, a tracer gas inlet at the sinter furnace for a tracer gas different from the sinter gas, and an outlet at the sinter furnace to output the sinter gas and the tracer gas. The example sinter system further includes: a support structure to support a sample green object in the sinter furnace, an opening at the support structure connected to the tracer gas inlet, the opening to output the tracer gas into the sinter furnace, and a detector to: determine an amount of the tracer gas flowing through the outlet during a sinter process as a sample green object positioned on the support structure changes shape during the sinter process with respect to the opening and modifies a flow rate of the tracer gas to the outlet; and determine when to stop the sinter process based on a determined amount of the tracer gas.

15 Claims, 8 Drawing Sheets

(51) Int. Cl.
  *B22F 10/85*    (2021.01)
  *B22F 10/322*   (2021.01)
  *F27B 5/04*     (2006.01)
  *F27B 1/00*     (2006.01)
  *B33Y 40/20*    (2020.01)

(52) U.S. Cl.
  CPC .......... *B22F 3/1021* (2013.01); *B22F 10/322* (2021.01); *B22F 10/85* (2021.01); *F27B 1/005* (2013.01); *F27B 5/04* (2013.01); *B22F 2003/1042* (2013.01); *B22F 2998/10* (2013.01); *B22F 2999/00* (2013.01); *B33Y 40/20* (2020.01)

(58) Field of Classification Search
  CPC .. B22F 3/1021; B22F 2003/1042; B22F 3/12; F27B 5/04; F27B 1/005; C21D 1/00
  See application file for complete search history.

(56) References Cited

U.S. PATENT DOCUMENTS

| | | | |
|---|---|---|---|
| 6,303,077 | B1 | 10/2001 | Arvidsson et al. |
| 11,668,528 | B2 * | 6/2023 | Liebeskind ........... C03C 13/048 |
| | | | 432/32 |
| 2007/0231181 | A1 | 10/2007 | Nakamura |
| 2021/0213525 | A1 * | 7/2021 | Champion ................ F27D 7/02 |
| 2021/0215426 | A1 * | 7/2021 | Champion ........... B22F 3/1007 |

FOREIGN PATENT DOCUMENTS

| | | | |
|---|---|---|---|
| GB | 603123 A | * | 6/1948 |
| JP | 2013083400 | | 5/2013 |

* cited by examiner

TRACER GAS ENDPOINT-MONITORED SINTER SYSTEMS

BACKGROUND

Powder metal manufacturing processes such as MIM (metal injection molding) and three-dimensional printing binder jetting produce metal objects from powdered metal materials. Such processes include preparing "green objects" that comprise a powdered metal and a binder. The binder material may be removed from a green object during a binder burnout phase of a sinter process, and the powdered metal may then be consolidated and densified in the sinter process to improve the strength and integrity of the object. Sinter processes expose green objects to high temperatures for predetermined periods of time to bond the powdered metal particles together. During the sinter process, objects are brought up to an appropriate sinter temperature that is below the melting point of the metal powder, and the objects are maintained at the sinter temperature according to a predetermined time-temperature profile.

BRIEF DESCRIPTION OF THE DRAWINGS

Reference will now be made, by way of example only, to the accompanying drawings in which.

Throughout the drawings, identical reference numbers designate similar, but not necessarily identical, elements.

DETAILED DESCRIPTION

Figure 1A:
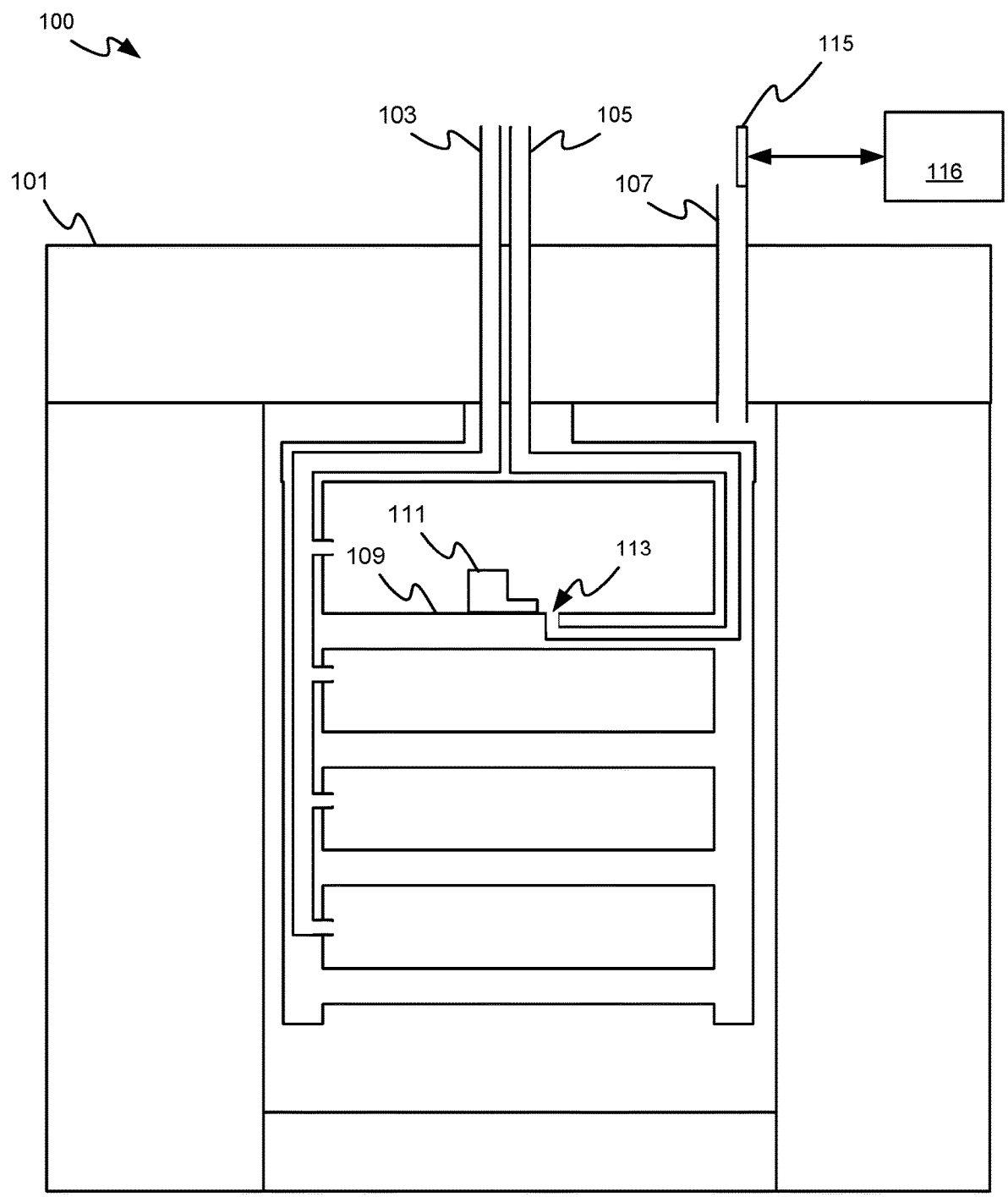
FIG. 1A shows a block diagram of an example sinter system suitable for monitoring the endpoint of a sinter process using a tracer gas.

Sintering is a heat treatment process often used to improve mechanical and other properties of "green" state objects or parts produced by different manufacturing methods such as binder jet three dimensional printing and MIM (metal injection molding) processes. A green object is an object whose material is in a weakly bound state, such as weakly bonded powder material before it has been sintered or fired. Sinter processes expose "green" objects to high temperatures for predetermined periods of time. Time-temperature profiles for sinter processes are generally determined based on experimentation with properties including the material type, material density, wall thickness, and total mass and general thermal load of the green objects to be sintered. Such profiles are designed to control the heating and cooling cycles of the sinter process so that the green objects within a furnace load are exposed to the proper sinter temperature for the correct amount of time that will bring the objects to a sinter endpoint or completion. However, determining such time-temperature profiles may be costly due to, for example, variations in thermal properties of different materials, variations in total thermal mass between different sinter runs, the matching of thermocouples to the process gas being used, and so on. In addition, the time-temperature profiles merely provide an indirect method for estimating when a sinter endpoint will be reached. Therefore, controlling sinter cycles based on predetermined time-temperature profiles may result in suboptimal quality among the sintered objects within a given sinter furnace load.

In some examples, a sinter furnace may be loaded with multiple green objects and programmed with a particular time-temperature profile to control the heating and cooling cycle of the furnace. The time-temperature profile for a given furnace load is generally determined through trial and error based on the expected thermal load of the green objects to be sintered, which considers the mass of the load as well as the dimensional and material characteristics of the objects, as noted above. However, a furnace load may include green objects with varying characteristics, such as objects that have different thermal loads and/or different sizes, shapes, and thicknesses. Such varying characteristics may further include variation of the metal powder use to produce the green objects; for example, batch-to-batch variations in metal composition, powder size distribution, and particle shape may impact time-temperature profiles for a sinter process. In some three-dimensional printing processes, such as binder jetting, for example, there may be a significant degree of variability among the green objects that are produced within different printing batches or within the same printing batch. Therefore, the profiles for controlling sinter cycle times are often developed to accommodate the worst-case scenario. Worst-case scenarios may be determined based on green objects that are expected to have the greatest thermal loads, the thickest object sections, and/or the types of metal powder materials that call for the longest furnace sinter times.

Because sinter cycle times are usually developed to accommodate green objects that represent such worst-case scenarios, other green objects within a same furnace load are often exposed to longer sinter times that may extend well beyond their sinter endpoints. Extended sinter times may result in an over-sinter of some objects and may degrade the quality and performance of the sintered objects, as well as increase the costs associated with operating the sinter furnace, including additional time, energy, and furnace wear and tear.

As noted above, during the sinter process green objects are brought up to an appropriate sinter temperature for predetermined periods of time to achieve the sinter endpoint or completion. Sinter temperatures are generally some percentage of the melting point temperature of the metal material being sintered. For example, sinter temperatures may be on the order of 70%-90% of the melting point. Measuring and monitoring furnace temperatures to ensure that the correct sinter temperature is reached and sustained at the center of the furnace "hot zone" may be challenging and costly.

One method for monitoring temperature in a sinter furnace involves the use of thermocouples, which may add significant cost to the sinter process. Thermocouples are application specific devices because they must be matched with the process gas and the temperatures being used for sintering the green object materials within a furnace load. In addition, thermocouples are typically located on the outside of the thermal mass cluster and are ideally routed to the center of the furnace hot zone to provide the most accurate temperature information. Furthermore, it should be noted that even when thermocouples may be used to provide accurate temperature monitoring and control over predetermined time periods, such accurate implementation of time-temperature profiles is not a definitive method for determining when a sinter endpoint has been reached. Rather, such accurate control provides at best, an indirect method for estimating when the sinter endpoint has been reached. As a result, sinter times are often extended to ensure that the worst-case objects in a furnace load reach a sinter endpoint which, as noted above, may cause an over-sinter of some objects within the furnace load.

Accordingly, provided herein is a sinter system which includes a tracer gas inlet to a sinter furnace and a support structure with an opening connected to the tracer gas inlet. The tracer gas inlet is different from a sinter gas inlet to the sinter furnace. The tracer gas enters the general atmosphere of the sinter furnace through the opening during a sinter process. A sample green object is arranged relative to the opening prior to the sinter process, and the sample green object changes shape during the sinter process to uncover or cover the opening during the sinter process, thereby changing the flow of the tracer gas into the sinter furnace during the sinter process. A detector at an outlet of the sinter furnace (or positioned) in any suitable location) determines and/or detects and/or measures an amount and/or concentration of the tracer gas flowing through the outlet during the sinter process as the sample green object positioned on the support structure changes shape with respect to the opening and modifies the flow rate of the tracer gas to the outlet. The detector may further determine when to stop the sinter process based on a determined amount and/or concentration of the tracer gas.

Figure 1B:
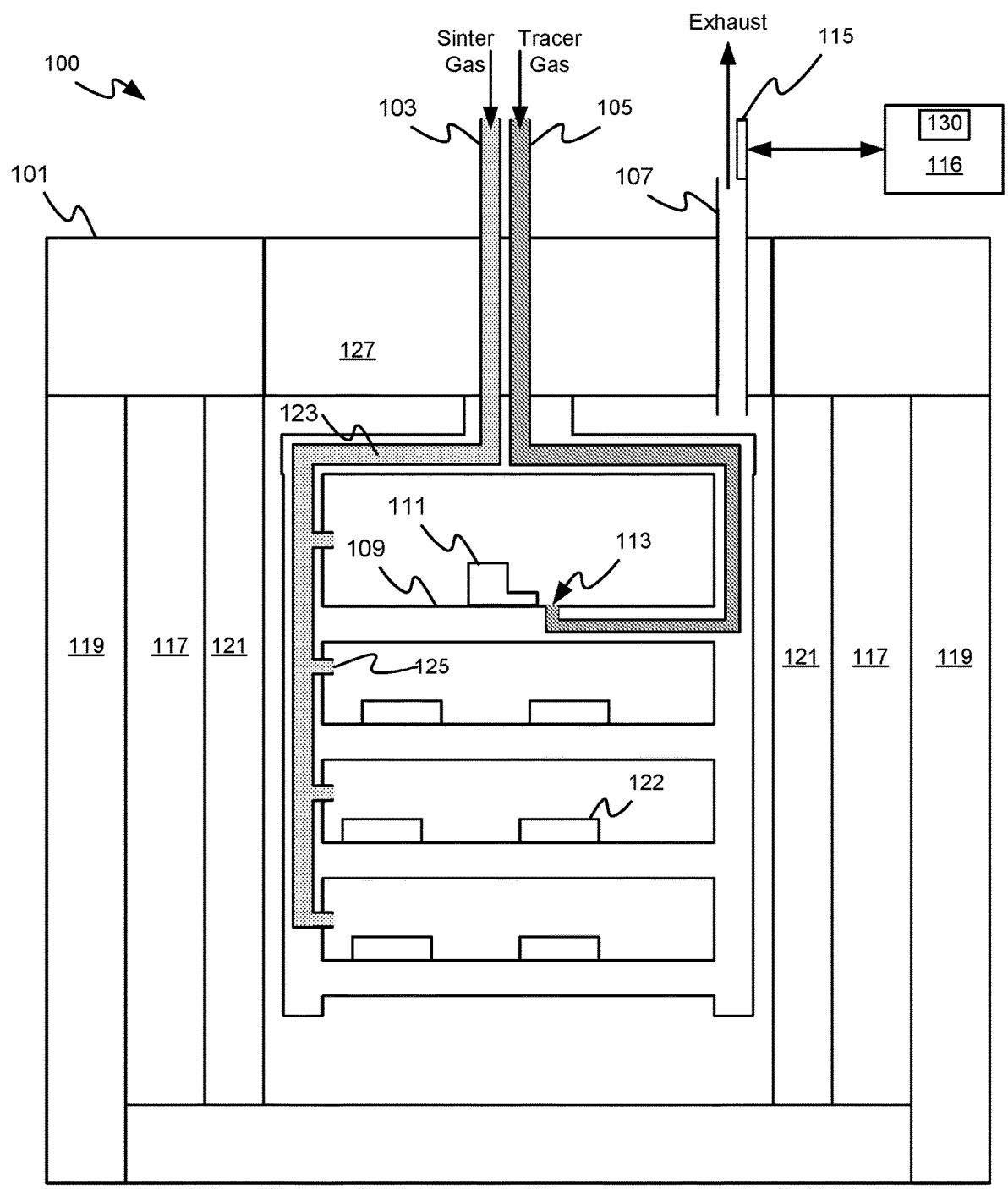
FIG. 1B shows a block diagram of the example sinter system of FIG. 1A in more detail.

FIG. 1A and FIG. 1B each show a block diagram of an example sinter system 100 suitable for detecting the endpoint of a sinter process and providing accurate sinter cycle times. FIG. 1B shows the example sinter system 100 in more detail than FIG. 1B. The example sinter system 100 is interchangeably referred to hereafter as the system 100.

With reference to FIG. 1A, the system 100 includes an example sinter furnace 101. The system 100 further includes a sinter gas inlet 103 at the sinter furnace 101 for a sinter gas. The system 100 further includes a tracer gas inlet 105 at the sinter furnace 101 for a tracer gas different from the sinter gas. The system 100 further includes an outlet 107 at the sinter furnace 101 to output the sinter gas and the tracer gas for example as exhaust from the sinter furnace 101. The system 100 further includes a support structure 109 to support a sample green object 111 in the sinter furnace 101. The system 100 further includes an opening 113 at the support structure 109 connected to the tracer gas inlet 105, the opening 113 to output the tracer gas into the sinter furnace 101. The system 100 further includes a detector 115 to determine an amount of the tracer gas flowing through the outlet 107 during a sinter process as the sample green object 111 positioned on the support structure 109 changes shape during the sinter process with respect to the opening 113 and modifies a flow rate of the tracer gas to the outlet 107. The system 100 further comprises a controller 116 in communication with the detector 115, the controller 116 to determine when to stop the sinter process based on a determined amount of the tracer gas. The controller 116 generally controls the sinter process, as described hereafter.

While the sample green object 111 is depicted in FIG. 1A as being away from (e.g. not covering) the opening 113, prior to the sinter process, the sample green object 111 is positioned on the support structure 109 such that the sample green object 111 changes shape during the sinter process with respect to the opening 113 to change the amount of the tracer gas flowing through the outlet 107 during the sinter process. Indeed, the sample green object 111 is depicted as being away from the opening 113 in FIG. 1A merely to show the opening 113. The location of the sample green object 111 relative to the opening 113 is described in more detail below.

With reference to FIG. 1B, which depicts the system 100 in more detail, a direction of flow of the sinter gas is shown by an arrow into the sinter furnace 101 at the sinter gas inlet 103, and a direction of flow of the tracer gas is shown by an arrow into the sinter furnace 101 at the tracer gas inlet 105. While not depicted, the system 100 may comprise gas flow controllers controlling respective rates of flow and/or respective pressures of the sinter gas and the tracer gas into, respectively, the sinter gas inlet 103 and the tracer gas inlet 105. FIG. 1 B also depicts a direction of flow of the exhaust of the sinter furnace 101, as shown by an arrow out of the sinter furnace 101 at the outlet 107.

With further reference to FIG. 1B, the example sinter furnace 101 is sometimes referred to as a "hot wall" design where electric heating elements 117 or other heating sources are located inside the sinter furnace 101 between a layer of insulation 119 and the furnace retort wall 121. The furnace retort wall 121 may be made from different materials including a refractory metal, ceramic, quartz, or other materials capable of withstanding high temperatures. Peak sinter temperatures in the sinter furnace 101 may depend on the type of material being sintered, with an example range of such temperatures reaching as high as between 1100° C. to 1400° C. In an example sinter process, once green objects 122 (sometimes referred to as the "load" or "furnace load" and which may include the sample green object 111) are loaded into the sinter furnace 101 on the support structure 109, the controller 116 may activate the heating elements 117 to begin heating the furnace retort wall 121. The furnace retort wall 121 may conduct or radiate the heat to the green objects 122 within the furnace.

While only one green object 122 is indicated, it is understood that, in FIG. 1B, the sinter furnace 101 has been loaded with a plurality of green objects 122 which, as depicted, are a different shape as the sample green object 111. While as depicted no green objects 122 are loaded onto a same shelf as the sample green object 111, in other examples, green objects 122 may be loaded onto a same shelf as the sample green object 111, as long as the green objects 122 do not interfere with the interaction of the sample green object 111 with the opening 113 as described below. Furthermore, while the opening 113 is depicted as being on a top-most shelf of the support structure 109, the opening 113 may be in any of the shelves of the support structure 109.

Also, during the sinter process, a sinter gas from a sinter gas supply (not depicted) may be introduced into the furnace atmosphere via the sinter gas inlet 103. The controller 116 may also control the flow of the sinter gas in to the sinter furnace 101.

In some examples, the sinter process includes a binder burnout phase where binder material (e.g., plastics) in the green objects 111, 122, is broken down by high temperatures, and the broken-down components of the binder material are removed by the sinter gas as it flows across the green objects 111, 122. The binder burnout phase may occur during the sinter process, for example, when the temperature within the furnace reaches approximately 400° C. A variety of gases may be introduced into the furnace including, for example, hydrogen, nitrogen, and carbon monoxide. Hydrogen gas is often introduced to serve as a reducing agent that helps keep the powder metal particles in the green objects 111, 122, from oxidizing and removes other contaminants. The hydrogen reduction process helps the surfaces of the metal particles remain metallic which improves the strength of bonds that are created between particles during a sinter process.

As depicted, the sinter gas inlet 103 is connected via tubes and/or gas channels 123 to multiple gas flow openings 125 in walls and/or a frame of the support structure 109 which, as depicted, comprises shelves and the like onto which the green objects 111, 122 are loaded for a sinter process. The paths of the tubes and/or gas channels 123 through the sinter furnace 101 are depicted schematically and it is understood that such paths are interior to the various components of the sinter furnace 101.

During the sinter process, the sinter gas from a gas supply (not depicted) may flow uniformly and continually through the sinter gas inlet 103 and into the sinter furnace 101 via the multiple gas flow openings 125. As depicted, the sinter gas inlet 103 may be formed in, and may pass through, a door or lid 127 of the sinter furnace 101. A main gas line may pass through the sinter gas inlet 103 of the furnace and be routed through the walls and/or frame of the support structure 109 via the gas channels 123. The main gas line may be further routed to the multiple gas flow openings 125 via the gas channels 123. A continual supply of sinter gas (e.g. as represented by the shading between the sinter gas inlet 103 and the gas flow openings 125) may be delivered into the sinter furnace 101 through the gas flow openings 125 to flow over the green objects 111, 122 that are positioned on the support structure 109. In some examples, a fan (not shown) may be provided inside the sinter furnace 101 to circulate the atmosphere. The pressure of the sinter gas as it flows into the sinter furnace 101 through the gas flow openings 125 pushes the atmosphere within the sinter furnace 101 out of the sinter furnace 101 through the outlet 107, which may also be located in the lid 127 of the sinter furnace 101. The atmosphere being pushed out of the furnace through the outlet 107 generally comprises gas, along with different elements being carried within the gas, such as the broken-down components of the binder material, and the contaminants and water vapor that are generated by a hydrogen reduction process. Furthermore, a pump or pumps connected to the outlet 107 may be used to maintain a given pressure within the sinter furnace 101.

To monitor the sinter process, the sinter furnace 101 has been adapted to include the tracer gas inlet 105 connected to the opening 113. As depicted, the tracer gas inlet 105 is also through the lid 127 and is connected to a tracer gas supply (not depicted). While the inlets 103, 105 are depicted as separate from one another, the inlets 103, 105 may be directly adjacent to each other.

The controller 116 (e.g. controlling a gas flow controller of the tracer gas) may also control the flow of the tracer gas in to the sinter furnace 101 via the tracer gas inlet 105. The sinter furnace 101 includes tubes and/or gas channels (e.g. through the lid 127 and through the support structure 109) connecting the tracer gas inlet 105 with the opening 113. A continual supply of tracer gas (e.g. as represented by the shading between the tracer gas inlet 105 and the opening 113) may be delivered into the sinter furnace 101 through the opening 113. The tracer gas is also pushed out through the outlet 107 (e.g. with the sinter gas, etc., as exhaust from the sinter furnace 101) to be monitored by the detector 115. The tracer gas is hence different from the sinter gas so that the detector 115 may monitor the tracer gas. For example, the sinter gas may include, but is not limited to, hydrogen while the tracer gas may include, but is not limited to, argon and/or another inert gas. The detector 115 may include, but is not limited to, a residual gas analyzer, and the like.

Furthermore, while detectors described herein, such as the detector 115, are described as determining an amount of the tracer gas, an amount of tracer determined by such detectors may be absolute amounts or relative amounts. Furthermore, the absolute or relative amounts of the tracer gas, as measured by the detector 115, may comprise, respectively, an absolute concentration (and the like) of the tracer gas or a relative concentration (and the like) of the tracer gas. For example, the detector 115 may be configured to determine an amount of the tracer gas relative to an initial amount and/or concentration of tracer gas determined and/or the detector 115 may be configured to determine an amount and/or concentration of the tracer gas as a ratio of tracer gas to sinter gas and/or vice versa. Indeed, any suitable determination of an amount and/or concentration of the tracer gas, absolutely or relatively, and the like, is within the scope of the present specification; similarly, any suitable detector that detects an amount and/or concentration of the tracer gas, absolutely or relatively, and the like, is within the scope of the present specification.

Furthermore, while the detector 115 is depicted as being located at the outlet 107, the outlet 107 may be generally connected via tubing, and the like to a pump or pumps (not depicted). The detector 115 may hence be located at any suitable position between the opening 113 and the pumps or pumps, and/or at a respective gas outlet of the pumps or pumps, and/or any position in the system 100 where the composition of the gas flowing through the opening 113 may be determined.

The opening 113 may be in an upward-facing surface of the support structure 109, for example in a shelf, and the like of the support structure 109, where the sample green object 111 may be located for a sinter process. However, the opening 113 may be in any surface of the support structure 109 where the sample green object 111 may change shape during the sinter process with respect to the opening 113 to modify a flow rate of the tracer gas to the outlet 107.

The controller 116 may be any suitable computing device to control the sinter process and hence may be further in communication with heater controllers (e.g. to control the heating elements 117), has flow controllers (e.g. to control the flow of the gases through the inlets 103, 105), and the like.

In general, the controller 116 receives measurements from the detector 115 and determines when to stop the sinter process based on the measurements and/or a determined amount of the tracer gas measured by the detector 115. The controller 116 be further configured to stop the sinter process based on the determined amount of the tracer gas.

However, in other examples, and as also depicted in FIG. 1B, the system 100 may include a notification device 130 to provide a notification based on the determined amount of the tracer gas. As depicted, the notification device 130 is incorporated into the controller 116. However, the notification device 130 may be separate from the controller 116. The notification device 130 may include, but is not limited to, a display screen, a speaker, a light device, and the like which provides a notification, such as an icon at a display screen, a speaker emitting a noise, a light device emitting light (e.g. of given color), and the like to indicate the determined amount of the tracer gas and/or an end of the sinter process. In some examples, the notification device 130 providing such a notification may alert an operator of the system 100 to manually stop the sinter process. Hence, the controller 116 may alternatively control the notification device 130 to provide a notification of when to stop the sinter process to cause such an operator of the system 100 to stop the sinter process.

The detector 115 may measure concentration of the tracer gas and/or relative changes in concentration of the tracer gas in gases emitted through the outlet 107. The concentration of the tracer gas exiting the sinter furnace 101 generally changes as the sample green object 111 changes shape relative to the opening 113 as described below. In some examples, the controller 116 may determine that the sinter process is to be stopped when the concentration of the tracer gas stops changing which may hence indicate that the sinter process for the green objects 122 in the sinter furnace 101 is also completed.

In particular, the sample green object 111 may comprise a sacrificial object that may be produced in the same manufacturing process batch as the green objects 122 within the same furnace load as the sample green object 111. Hence, because the sample green object 111, and the green objects 122 sintered with the sample green object 111, comprise the same type of powder material with the same density and particle sizes, they behave in the same or similar manner during the sinter process. That is, during a sinter process, the green objects 122 undergo the same material densification and dimensional contraction as the sample green object 111. While the sample green object 111 may not be the same shape or size as the green objects 122 to be sintered, the sample green object 111 may be designed to match the average wall thickness of the green objects 122. Nevertheless, the sinter time of objects does not change significantly based on the relative thickness or size of the objects. Rather, the main factors that determine sinter times are the density of the object and the material type and particle size distribution of the material. The object thickness and size are of less significance in affecting sinter times because the time constants for heat transfer are smaller than the time constants for sinter. Thus, the time to heat both a small and large object in a same manufacturing process batch, or a thin and thick object, is mostly insignificant in comparison to the time it takes the objects to begin densification during the sinter process. Therefore, the sinter time for the sample green object 111 is very close to the sinter time for the green objects 122. Consequently, dimensional changes in the sample green object 111 may be used to indicate corresponding changes in the green objects 122 throughout the sinter process, including indicating the point when the sinter process for the green objects 122 reaches an endpoint. Hence, the changes of concentration of the tracer gas flowing through the outlet 107, and as determined by the detector 115, and which is caused by such dimensional changes in the sample green object 111 during a sinter process, may be monitored and used to indicate when the green objects 122 have reached a sinter endpoint.

However, in other examples, the controller 116 may determine when to stop the sinter process based on factors. For example, the end of a sinter process may be a function of the binder material and/or the metal of the green objects 122 and/or target material properties of the green objects 122 which result from the sinter process. Hence, in some examples, the controller 116 may determine when to stop the sinter process based on the concentration of the tracer gas reaching a given relative value, but before the concentration of the tracer gas stops changing. In some examples, the controller 116 may determine when to stop the sinter process based on when the concentration of the tracer gas stops changing, plus additional time after the concentration of the tracer gas stops changing (e.g. to further anneal the green objects 122).

Figure 2A:
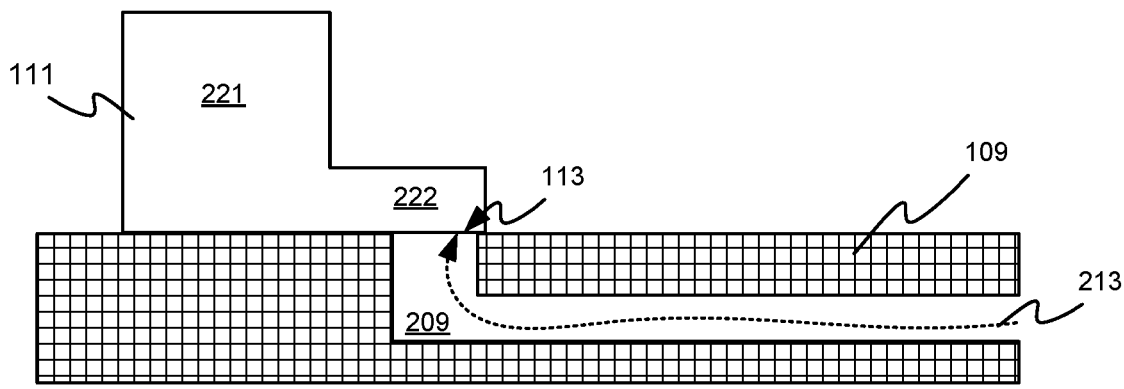
FIG. 2A, FIG. 2B and FIG. 2C show a side view of a sample green object changing shape during a sinter process with respect to an opening in a support structure of a sinter furnace of the example sinter system of FIG. 1A.
Figure 2B:
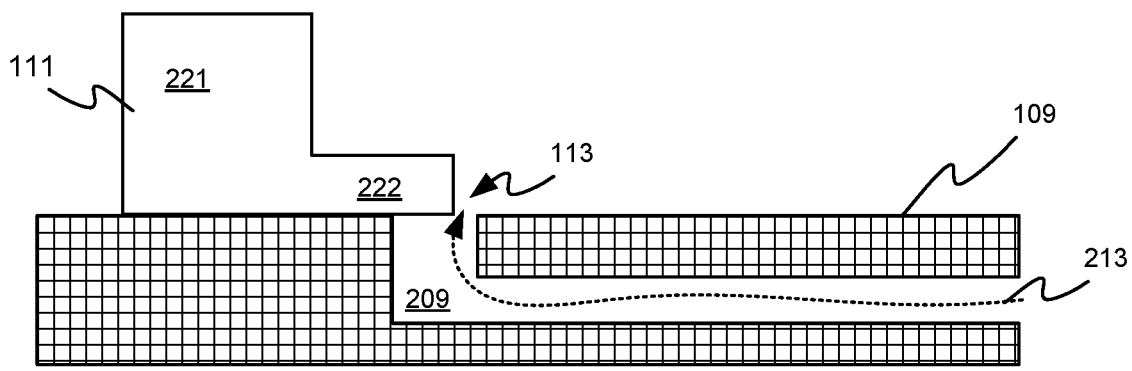
Figure 2C:
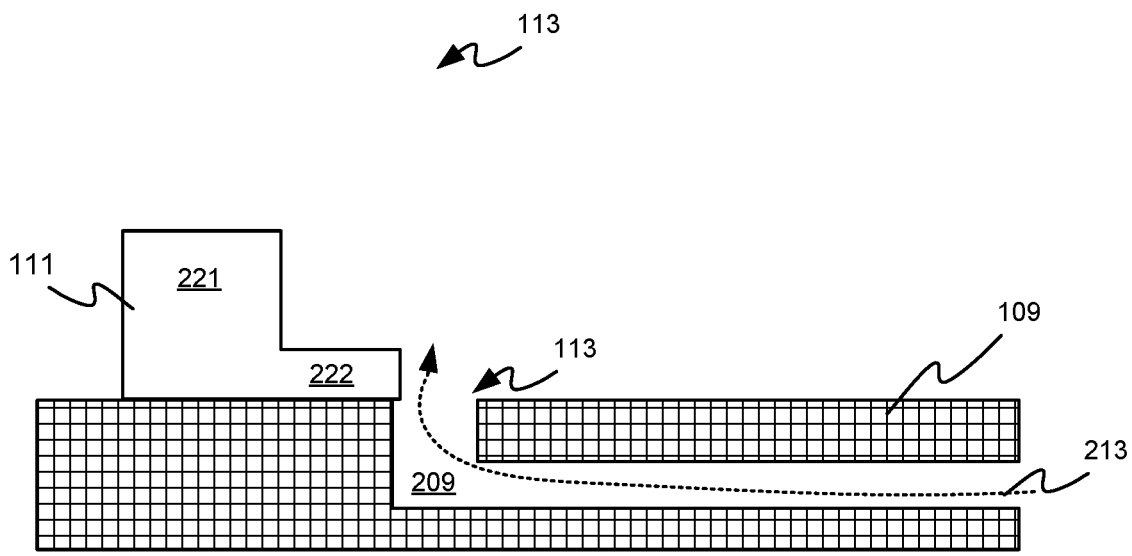

Attention is next directed to FIG. 2A, FIG. 2B and FIG. 2C and FIG. 3A, FIG. 3B and FIG. 3C, each of which depicts the sample green object 111 on a shelf of the support structure 109 during a sinter process. In FIG. 2A, FIG. 2B and FIG. 2C a side view of the sample green object 111 is depicted, and the shelf of the support structure 109 is depicted in cross-section to show detail of a gas channel 209 through the support structure 109 to the opening 113. Comparing FIG. 1A and FIG. 1B to FIG. 2A, FIG. 2B and FIG. 2C, it is apparent that the depicted gas channel 209 in FIG. 2A, FIG. 2B and FIG. 2C is connected to the tracer gas inlet 105 such that a tracer gas 213 flows from the tracer gas inlet 105 to the opening 113, at least via the gas channel 209.

Figure 3A:
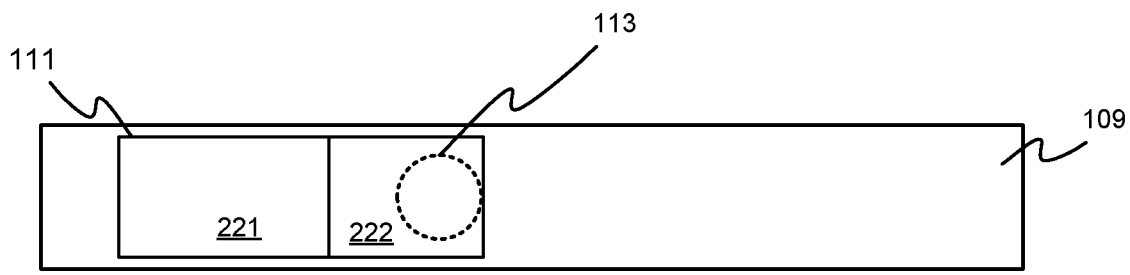
FIG. 3A, FIG. 3B and FIG. 3C a top view of a sample green object changing shape during a sinter process with respect to the opening in the support structure of the sinter furnace of the example sinter system of FIG. 1A.
Figure 3B:
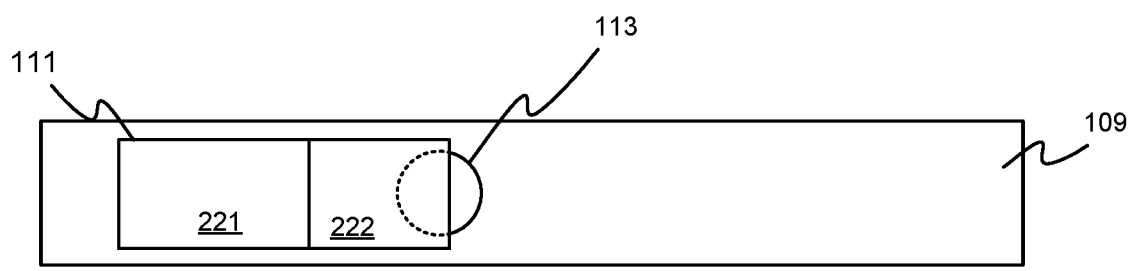
Figure 3C:
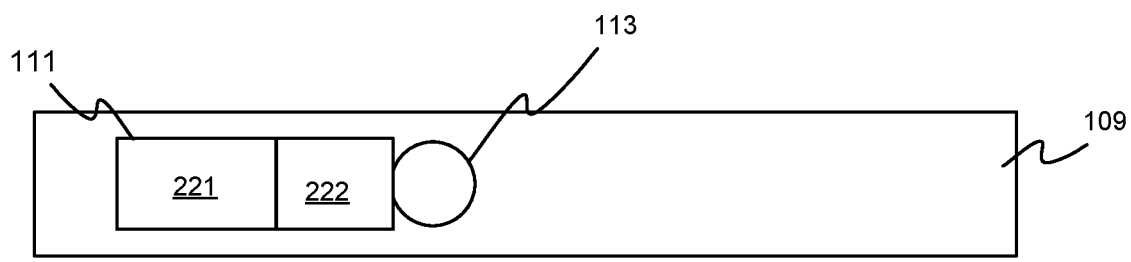

Each of FIG. 3A, FIG. 3B and FIG. 3C correspond, respectively, to FIG. 2A, FIG. 2B and FIG. 2C, but show the sample green object 111 on the shelf of the support structure 109 during the sinter process from a top view, with the opening 113 and/or a portion thereof, depicted in outline when covered by the sample green object 111.

As best seen in FIG. 3A, in the depicted examples, the opening 113 is round; however, the opening 113 may have any suitable shape.

FIG. 2A and FIG. 3A each depict the sample green object 111 at the beginning of a sinter process and/or before the sample green object 111 has changed shape due to the sinter process. As depicted, the opening 113 is at an upward surface of the support structure 109 and the sample green object 111 includes a thick portion 221 and a thin portion 222 extending from the thick portion 221. Furthermore, an edge of the thin portion 222 (opposite the thick portion 221) is arranged to about align with an edge of the opening 113 such that the thin portion 222 covers the opening 113 and/or about covers the opening 113 before the sample green object 111 has changed shape due to the sinter process. In general, during the sinter process, the sample green object 111 shrinks about the center-of-mass (which will be located in the thick portion 221). As such, during the sinter process, the thick portion 221 remains relatively stationary while the thin portion 222 shrinks towards the thick portion 221 to uncover the opening 113.

As seen FIG. 2A and FIG. 3B, before the sample green object 111 has changed shape due to the sinter process, the sample green object 111 covers the opening 113. Hence, a rate of flow and/or pressure of the tracer gas flowing into the tracer gas inlet 105 may be selected that does not cause the sample green object 111 to be displaced while the sample green object 111 covers the opening 113.

With reference to FIG. 2B and FIG. 3B, part way during the sinter process, as the thin portion 222 of the sample green object 111 is shrinking towards the thick portion 221, the opening 113 is partially uncovered allowing more of the tracer gas 213 to enter the sinter furnace 101, as compared to when the sample green object 111 covers the opening as in FIG. 2A and FIG. 3A.

Similarly, as depicted in FIG. 2C and FIG. 3C, later in the sinter process, as the thin portion 222 of sample green object 111 continues to shrink towards the thick portion 221, and/or stops shrinking, the opening 113 may be fully uncovered allowing yet more of the tracer gas 213 to enter the sinter furnace 101 as compared to when the sample green object 111 partially covers the opening as in FIG. 2B and FIG. 3B. However, while in FIG. 2C and FIG. 3C the sample green object 111 has shrunk to fully uncover the opening 113, in other examples, when the sample green object 111 stops shrinking, the opening 113 may still be partially covered depending, for example, on the amount of shrinkage and/or the initial location of the sample green object 111 relative to the opening 113.

Regardless, as the sample green object 111 shrinks relative to the opening 113, the concentration and/or rate of flow of the tracer gas 213 changes in the sinter furnace 101, and hence the concentration and/or rate of flow of the tracer gas 213 that exits the sinter furnace 101 through the outlet 107 also changes. The detector 115 will hence generally detect and/or determine a change in the concentration of the tracer gas 213 and the controller 116 may determine when to stop the sinter process based on a determined amount of the tracer gas, for example, by controlling the heating elements 117 to ramp down and/or reducing (or stopping) the flow of the sinter gas. The controller 116 may further reduce (and/or stop) the flow of the tracer gas.

Hence, as described with reference to FIG. 2A, FIG. 2B and FIG. 2C and FIG. 3A, FIG. 3B and FIG. 3C, in some examples, the sample green object 111 is to shrink relative to the opening 113 to uncover the opening during the sinter process to modify the flow rate of the tracer gas through the opening 113. As further described with reference to FIG. 2A, FIG. 2B and FIG. 2C and FIG. 3A, FIG. 3B and FIG. 3C, in some examples, the sample green object 111 may include a thick portion 221 and a thin portion 222 extending from the thick portion 221, the thin portion 222 to be arranged to cover the opening 113 prior to the sinter process, the thin portion 222 to uncover the opening 113 during the sinter process to modify the flow rate of the tracer gas through the opening 113.

Hence, when the sample green object 111 comprises a sacrificial object that may be produced in the same manufacturing process batch as the green objects 122, and the sample green object 111 interacts with the opening 113, as described above, during a sinter process of the green objects 122, the sinter process may be stopped as described above, which may obviate an operator of the system 100 from having to perform sinter test runs to determine sinter times and/or time-temperature profile, and without having to rely on thermocouples, and the like.

However, the sample green object 111 may have other shapes. For example, the sample green object 111 may have a shape similar to the other green objects 122 being sintered during the sinter process, and/or the sample green object 111 may not have thick portion and a thin portion but may be relatively uniform in cross-section and/or have a block shape, and the like.

However, the sample green object 111 may further be shaped such that, at the beginning of the sinter process, the opening 113 is uncovered and, as the sample green object 111 changes shape during the sinter process, the opening 113 is covered.

Figure 4A:
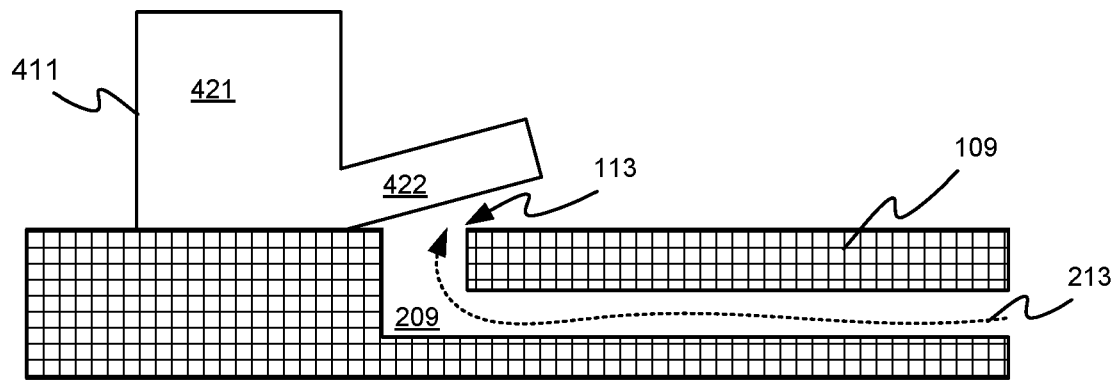
FIG. 4A, and FIG. 4B show a side view of a sample green object with a sag portion which, during a sinter process, sags onto the opening in the support structure of the sinter furnace of the example sinter system of FIG. 1A.
Figure 4B:
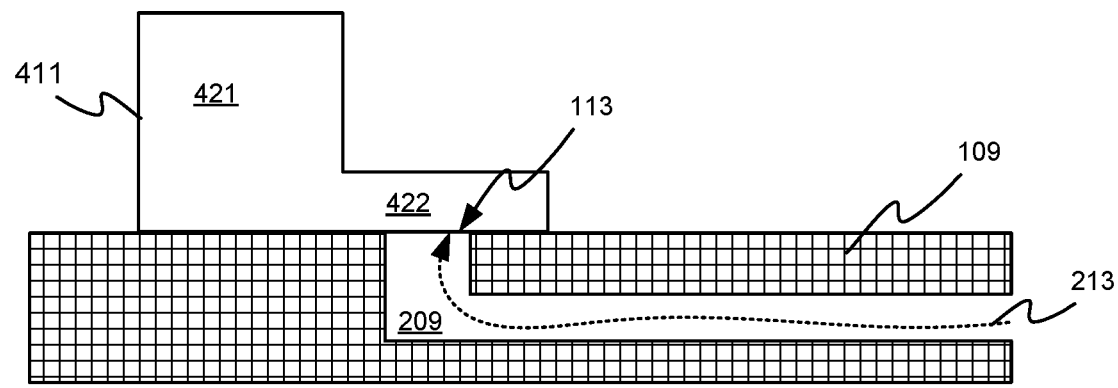

For example, attention is next directed to FIG. 4A and FIG. 4B which respectively depict a side view of an alternative sample green object 411 at the beginning of a sinter process and during (and/or after) the sinter process, with the shelf of the support structure 109 depicted in cross section, as in FIG. 2A, FIG. 2B and FIG. 2C. In particular, FIG. 4A and FIG. 4B depict the sample green object 411 which includes a portion 421 (e.g., corresponding to the thick portion 221 of the sample green object 111) and a sag portion 422, the sag portion 422 extending at a non-zero-angle from the portion 421. The sag portion 422 is arranged to align with the opening 113 (e.g. extend over the opening 113) prior to the sinter process, for example as depicted in FIG. 4A. As best seen in FIG. 4B, during the sinter process, the sag portion 422 is to sag onto the opening 113 to cover the opening 113 to modify the flow rate of the tracer gas through the opening 113. In other words, the sag portion 422 sags during the sinter process as the binder material heats up and burns off.

Figure 5A:
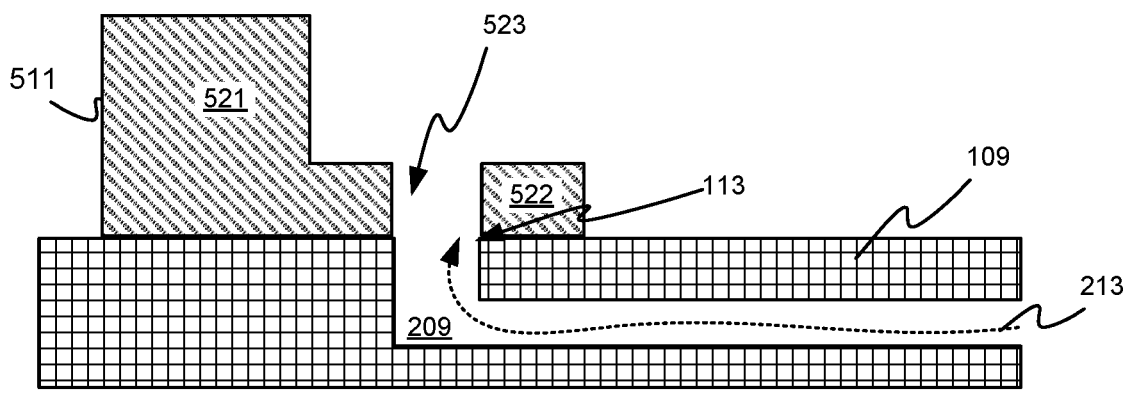
FIG. 5A, FIG. 5B and FIG. 5C show a side view of a sample green object with an aperture which, during a sinter process, covers the opening in the support structure of the sinter furnace of the example sinter system of FIG. 1A.
Figure 5B:
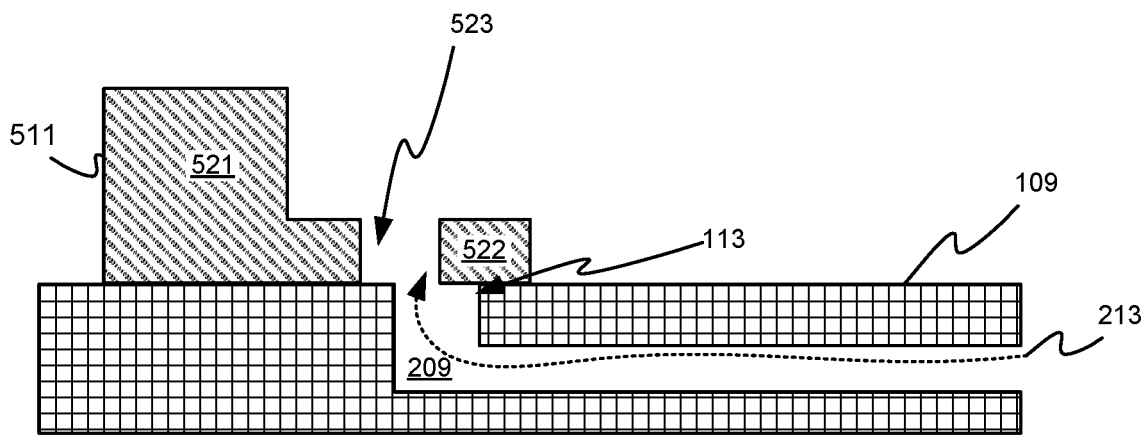
Figure 5C:
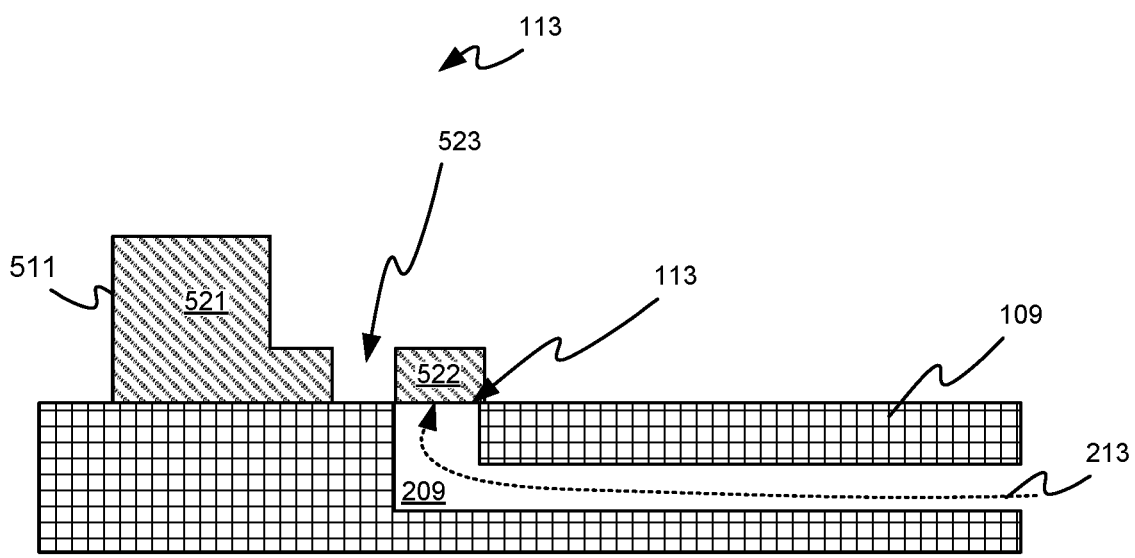

Attention is next directed to FIG. 5A, FIG. 5B and FIG. 5C and FIG. 6A, FIG. 6B and FIG. 6C, each of which depicts a sample green object 511 on a shelf of the support structure 109 during a sinter process. The sample green object 511 changes shape during the sinter process to cover the opening 113. In FIG. 5A, FIG. 5B and FIG. 5C a side view of the sample green object 511 is depicted, and the shelf of the support structure 109 is depicted in cross-section to show detail of the gas channel 209 through the support structure 109 to the opening 113. In each of FIG. 5A, FIG. 5B and FIG. 5C the sample green object 511 is also depicted in cross-section.

Figure 6A:
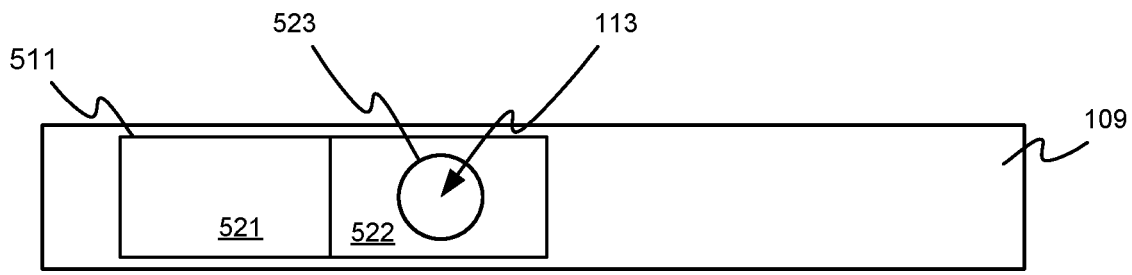
FIG. 6A, FIG. 6B and FIG. 6C show a top view of a sample green object with an aperture which, during a sinter process, covers the opening in the support structure of the sinter furnace of the example sinter system of FIG. 1A.
Figure 6B:
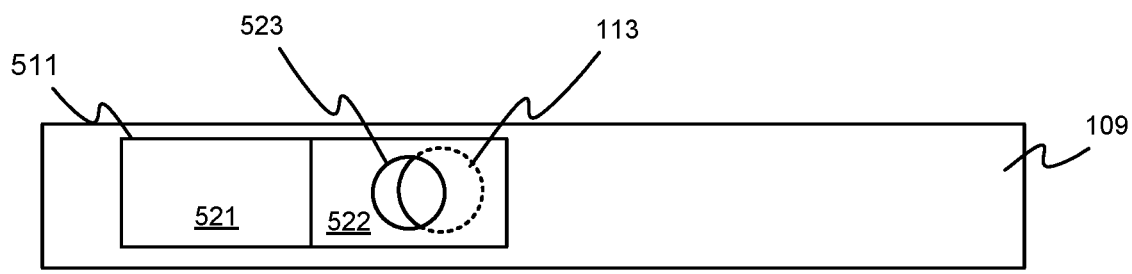
Figure 6C:
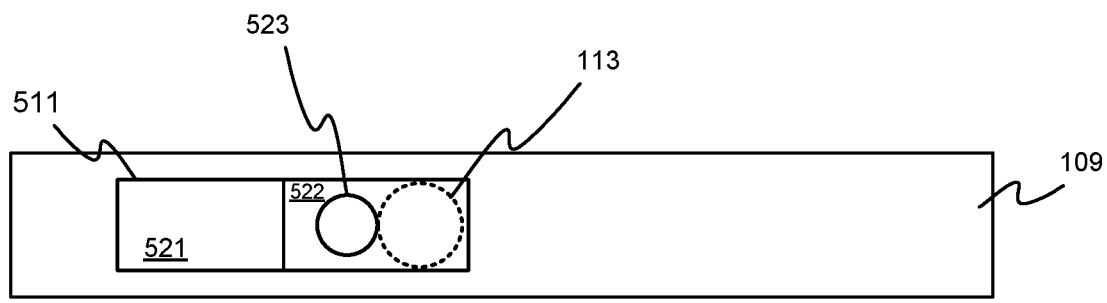

Each of FIG. 6A, FIG. 6B and FIG. 6C correspond, respectively, to FIG. 5A, FIG. 5B and FIG. 5C, but show the sample green object 511 on the shelf of the support structure 109 during the sinter process from a top view, with the opening 113 and/or a portion thereof, depicted in outline when covered by the sample green object 511.

Similar to the sample green object 111, the sample green object 511 comprises a thick portion 521 and a thin portion 522 extending from the thick portion 521. However, in contrast to the sample green object 111, the sample green object 511 further comprises an aperture 523 through the thin portion 522, the aperture 523 to be arranged to align with the opening 113 prior to the sinter process, the sample green object 511 to shrink relative to the opening 113 during the sinter process to cover the opening 113 via movement of the aperture 523 to modify the flow rate of the tracer gas through the opening 113

For example, FIG. 5A and FIG. 6A each depict the sample green object 511 at the beginning of a sinter process and/or before the sample green object 511 has changed shape due to the sinter process, with the aperture 523 aligned with opening 113. Hence, the tracer gas 213 flows through the opening 113 and through the aperture 523 into the sinter furnace 101. As depicted, the aperture 523 is of a similar shape and size as the opening 113. However, the aperture 523 may be a different shape and/or different size from the opening 113.

With attention next directed to FIG. 5B and FIG. 6B, part way during the sinter process, as the thin portion 522 of sample green object 511 is shrinking towards the thick portion 521, the aperture 523 also shrinks and moves away from the opening 113 to partially cover the opening 113 to reduce flow of the tracer gas 213 entering the sinter furnace 101, as compared to when the aperture 523 is aligned with the opening as in FIG. 5A and FIG. 6A.

Similarly, as depicted in FIG. 5C and FIG. 6C, later in the sinter process, as the thin portion 522 of the sample green object 511 continues to shrink towards the thick portion 521, and/or stops shrinking, the aperture 523 is no longer aligned with the opening 113, and a remainder of the thin portion 522 covers the opening 113, further reducing flow of the tracer gas 213 into the sinter furnace 101, as compared to when the sample green object 511 partially covers the opening as in FIG. 5B and FIG. 6B. Hence, a length of the thin portion 522, and/or the size and/or position of the aperture 523, may be selected such that, once the sample green object 511 stops shrinking, the aperture 523 is fully unaligned with the opening 113 and/or a remainder of the thin portion 522 covers the opening 113.

In some examples, the support structure 109 may be adapted to assist in the alignment of a sample green object with the opening 113. In particular, the system 100 may be adapted to include a registration datum at the support structure 109 to align a sample green object with the opening 113. As understood herein, a registration datum may comprise any suitable physical device at the support structure 109, and the like, to align a sample green object, such as the sample green objects 111, 411, 511, with the opening 113. For example, such a registration datum comprises a fixed starting point from which a sample green object shrinks during the sinter process.

Figure 7:
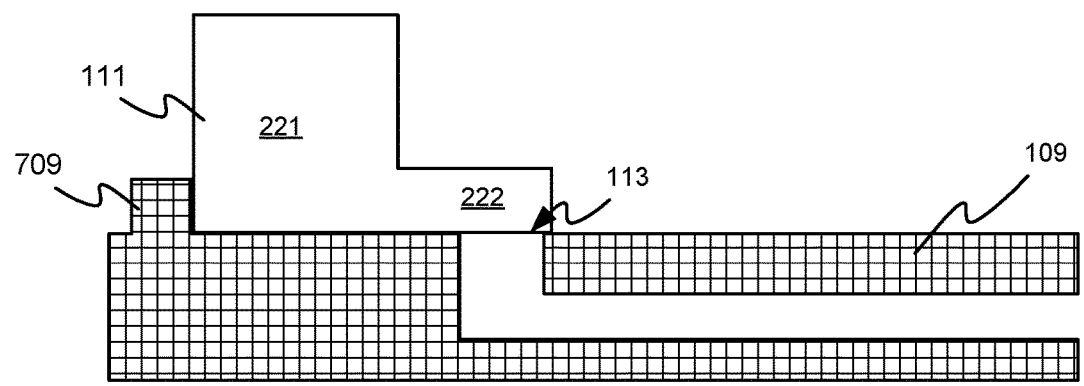
FIG. 7 depicts a side view of an example support structure having a registration datum in the form of a protrusion which locates a sample green object relative to an opening in the example support structure.

For example, attention is next directed to FIG. 7, which is substantially similar to FIG. 2A, with like components having like numbers. However, in these examples, the support structure 109 has been adapted to include a registration datum in the form of a protrusion 709 from the support structure 109, adjacent to the opening 113, the protrusion 709 to locate the sample green object 111 adjacent to the opening 113. For example, the protrusion 709 may comprise a ridge and/or a more than one ridge (e.g. in a corner shape and/or a U-shape, shaped to mate with a base of the sample green object 111) which, when the sample green object 111 is positioned against the protrusion 709, and/or the sample green object 111 is mated with the protrusion 709, causes the sample green object 111 to align with the opening 113 and/or causes the thin portion 222 to cover the opening 113 and/or causes an edge of the thin portion 222 (e.g. furthest from the thick portion 221) to align with an edge of the opening 113 while covering the opening 113. The sample green object 111 may be positioned against the protrusion 709, and/or the sample green object 111 may be mated with the protrusion 709 when the sinter furnace 101 is loaded with the green objects 122. Regardless, the protrusion 709 provides the sample green object 111 (and other similar sample green objects used in later runs) with a consistent starting position from run-to-run and may ensure that the sample green object 111 changes shape during the sinter process with respect to the opening 113 to modify a flow rate of the tracer gas to the outlet 107.

Figure 8:
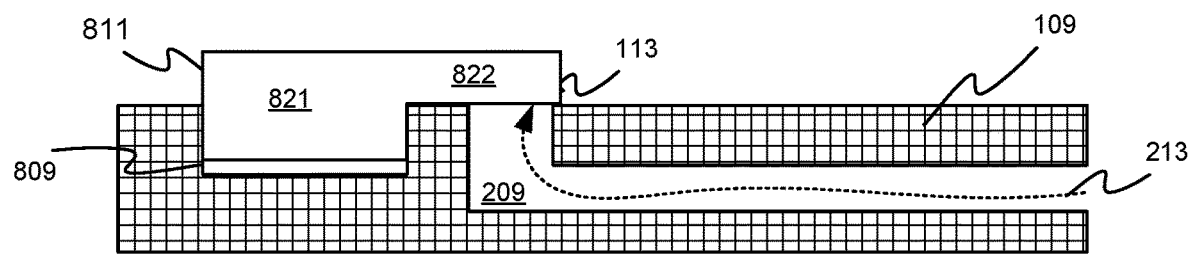
FIG. 8 depicts a side view of an example support structure having a registration datum in the form of an indentation which mates with a corresponding portion of a sample green object to locate the sample green object relative to an opening in the example support structure; and, FIG. 9 depicts a side view of an example support structure having a registration datum in the form of a ramp which locates a sample green object relative to an opening in the example support structure.

Attention is next directed to FIG. 8, which is substantially similar to FIG. 2A, with like components having like numbers. However, in these examples, the support structure 109 has been adapted to include a registration datum in the form of an indentation 809 (or alternatively a hole) in the support structure 109, adjacent to the opening 113, to mate with a corresponding portion of a sample green object 811. In particular, the depicted sample green object 811 comprises a thick portion 821 and a thin portion 822, similar to the sample green object 111, however the thick portion 821 and the indentation 809 are adapted to mate with each other, such that the sample green object 811 may be inverted (e.g. relative to the position of the sample green object 111 in FIG. 7) to insert the thick portion 821 into the indentation 809. When the sample green object 811 is mated with the indentation 809, the thin portion 822 is positioned to cover the opening 113 and/or causes an edge of the thin portion 222 (e.g. furthest from the thick portion 821) to align with an edge of the opening 113 while covering the opening 113. Hence, the indentation 809 provides the sample green object 111 (and other similar sample green objects used in later runs) with a consistent starting position from run-to-run and may ensure that the sample green object 111 changes shape during the sinter process with respect to the opening 113 to modify a flow rate of the tracer gas to the outlet 107.

Figure 9:
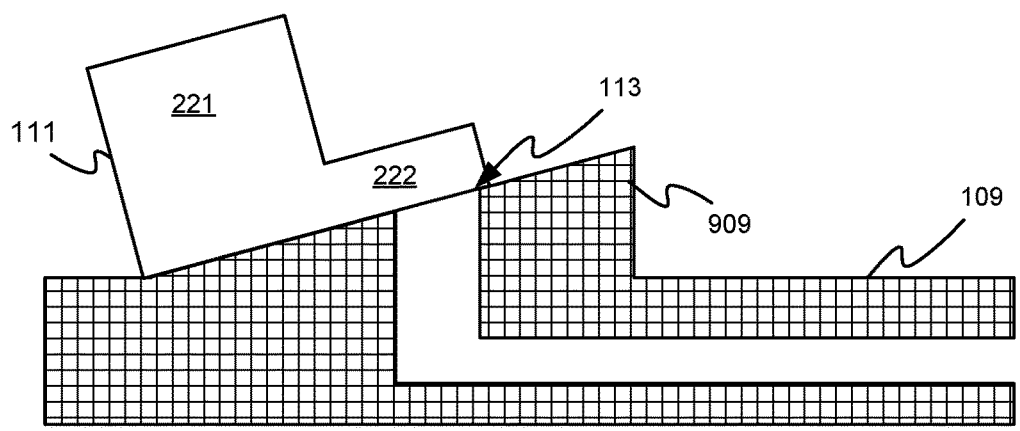

Attention is next directed to FIG. 9, which is substantially similar to FIG. 2A, with like components having like numbers. However, in these examples, the support structure 109 has been adapted to include a registration datum in the form of a ramp 909 in the support structure 109, the opening 113 being in and/or through, the ramp 909. In these examples, the sample green object 111, and the like, is placed on the ramp 909 with the thick portion 221 at a bottom edge of the ramp 909 and the thin portion 222 extending to cover the opening 113. As the center of gravity of the sample green object 111 is towards the bottom edge of the ramp 909, the weight of the sample green object 111 generally keeps the sample green object 111 aligned with the bottom edge of the ramp 909 during the sinter process. Hence, the ramp 909 provides the sample green object 111 (and other similar sample green objects used in later runs) with a consistent starting position from run-to-run and may ensure that the sample green object 111 changes shape during the sinter process with respect to the opening 113 to modify a flow rate of the tracer gas to the outlet 107.

It is further understood that while each of the registration datum are described herein with respect to a sample green object which uncovers the opening 113 during the sinter process, each of the registration datum described herein may be adapted for use with sample green objects which cover the opening 113 during the sinter process, for example the sample green objects 411, 511, and the like. Similarly, any of the sample green objects described herein may be adapted for use with any of the registration datum described herein.

Hence, described herein are sinter systems which include a support structure to support a sample green object in a sinter furnace. The sinter systems described herein further include an opening at a surface of the support structure, the opening to provide a path through the sinter furnace for a tracer gas different from a sinter gas. The sinter systems described herein further include a detector to determine an amount of the tracer gas flowing through the opening during a sinter process as the sample green object positioned on the support structure changes shape during the sinter process with respect to the opening and modifies a flow rate of the tracer gas through the opening. The sinter systems described herein further include a controller in communication with the detector, the controller to determine when to stop the sinter process based on a determined amount of the tracer gas. Furthermore, any of the sinter systems described herein may be adapted in any suitable manner which allows and/or enables monitoring concentration of the tracer gas exiting the sinter furnace and/or flow of the tracer gas through the opening in the support structure. Indeed, in some examples, the tracer gas may enter the sinter furnace with the sinter gas (e.g. via a common gas inlet), and the opening may be connected to a sampling outlet, via which the amount of tracer gas which flows into the opening (e.g., along with other gases in the sinter furnace) may be monitored using a suitably mounted detector.

It should be recognized that features and aspects of the various examples provided above may be combined into further examples that also fall within the scope of the present disclosure.

The invention claimed is:

1. A sinter system comprising:
 a sinter gas inlet at a sinter furnace for a sinter gas;
 a tracer gas inlet at the sinter furnace for a tracer gas different from the sinter gas;
 an outlet at the sinter furnace to output the sinter gas and the tracer gas;
 a support structure to support a sample green object in the sinter furnace;
 an opening at the support structure connected to the tracer gas inlet, the opening to output the tracer gas into the sinter furnace;
 a detector to determine an amount of the tracer gas flowing through the outlet during a sinter process as the sample green object positioned on the support structure changes shape during the sinter process with respect to the opening and modifies a flow rate of the tracer gas to the outlet; and
 a controller in communication with the detector, the controller to determine when to stop the sinter process based on a determined amount of the tracer gas.

2. The sinter system of claim 1, further comprising a notification device to provide a notification based on the determined amount of the tracer gas.

3. The sinter system of claim 1, wherein the controller is further configured to stop the sinter process based on the determined amount of the tracer gas.

4. The sinter system of claim 1, wherein the opening is at an upward surface of the support structure.

5. The sinter system of claim 1, wherein the opening is connected to the sinter gas inlet via a tube or a gas channel in the support structure.

6. A sinter system comprising:
 a support structure to support a sample green object in a sinter furnace;
 an opening at a surface of the support structure, the opening to provide a path through the sinter furnace for a tracer gas different from a sinter gas; and
 a detector to determine an amount of the tracer gas flowing through the opening during a sinter process as the sample green object positioned on the support structure changes shape during the sinter process with respect to the opening and modifies a flow rate of the tracer gas through the opening; and
 a controller in communication with the detector, the controller to determine when to stop the sinter process based on a determined amount of the tracer gas.

7. The sinter system of claim 6, wherein the sample green object is to shrink relative to the opening to uncover the opening during the sinter process to modify the flow rate of the tracer gas through the opening.

8. The sinter system of claim 6, wherein the sample green object includes an aperture to be arranged to align with the opening prior to the sinter process, the sample green object to shrink relative to the opening during the sinter process to cover the opening via movement of the aperture to modify the flow rate of the tracer gas through the opening.

9. The sinter system of claim 6, wherein the sample green object includes a sag portion to be arranged to align with the opening prior to the sinter process, the sag portion to sag onto the opening during the sinter process to cover the opening to modify the flow rate of the tracer gas through the opening.

10. The sinter system of claim 6, wherein the sample green object includes a thick portion and a thin portion extending from the thick portion, the thin portion to be arranged to cover the opening prior to the sinter process, the thin portion to uncover the opening during the sinter process to modify the flow rate of the tracer gas through the opening.

11. A sinter system comprising:
 a support structure to support a sample green object in a sinter furnace;
 an opening at a surface of the support structure, the opening to provide a path through the sinter furnace for a tracer gas different from a sinter gas; and
 a registration datum at the support structure to align the sample green object with the opening;
 a detector to determine an amount of the tracer gas flowing through the opening during a sinter process as the sample green object positioned on the support structure changes shape during the sinter process with respect to the opening and modifies a flow rate of the tracer gas through the opening; and
 a controller in communication with the detector, the controller to determine when to stop the sinter process based on a determined amount of the tracer gas.

12. The sinter system of claim 11, wherein the registration datum comprises a protrusion from the support structure, adjacent to the opening, to locate the sample green object adjacent to the opening.

13. The sinter system of claim 11, wherein the registration datum comprises an indentation or a hole in the support structure, adjacent to the opening, to mate with a corresponding portion of the sample green object.

14. The sinter system of claim 11, wherein the registration datum comprises a ramp in the support structure, the opening being in the ramp.

15. The sinter system of claim 11, wherein the detector is located at an outlet of the sinter furnace or at a pump to draw the tracer gas and the sinter gas out of the sinter furnace.

* * * * *